US008826257B2

(12) United States Patent
Al-Otoom et al.

(10) Patent No.: US 8,826,257 B2
(45) Date of Patent: Sep. 2, 2014

(54) MEMORY DISAMBIGUATION HARDWARE TO SUPPORT SOFTWARE BINARY TRANSLATION

(75) Inventors: Muawya M. Al-Otoom, Beaverton, OR (US); Paul Caprioli, Hillsboro, OR (US); Abhay S. Kanhere, Fremont, CA (US); Arvind Krishnaswamy, San Jose, CA (US); Omar M. Shaikh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 13/435,165

(22) Filed: Mar. 30, 2012

(65) Prior Publication Data

US 2013/0262838 A1    Oct. 3, 2013

(51) Int. Cl.
*G06F 9/45*    (2006.01)

(52) U.S. Cl.
USPC ............ 717/161; 717/159; 717/160; 717/151

(58) Field of Classification Search
None
See application file for complete search history.

(56) References Cited

U.S. PATENT DOCUMENTS

| | | | | |
|---|---|---|---|---|
| 5,694,577 A * | 12/1997 | Kiyohara et al. | ............. | 711/167 |
| 5,758,051 A * | 5/1998 | Moreno et al. | ...................... | 714/2 |
| 6,247,173 B1 * | 6/2001 | Subrahmanyam | ............ | 717/160 |
| 7,086,035 B1 * | 8/2006 | Mericas | .......... | 717/127 |
| 7,257,699 B2 * | 8/2007 | Chaudhry et al. | ............ | 712/219 |
| 7,257,700 B2 * | 8/2007 | Chaudhry et al. | ............ | 712/235 |
| 7,263,603 B2 * | 8/2007 | Chaudhry et al. | ............ | 712/228 |
| 7,484,080 B2 * | 1/2009 | Chaudhry et al. | ............ | 712/225 |
| 7,590,825 B2 * | 9/2009 | Krimer et al. | ................. | 712/216 |
| 7,634,635 B1 * | 12/2009 | Holscher et al. | .............. | 711/220 |
| 7,747,993 B2 * | 6/2010 | Onder | .......................... | 717/159 |
| 7,752,613 B2 * | 7/2010 | Guo et al. | ...................... | 717/153 |
| 8,346,760 B2 * | 1/2013 | Wang et al. | ................... | 707/720 |
| 8,412,914 B2 * | 4/2013 | Gonion | ............................. | 712/7 |
| 2006/0218542 A1 * | 9/2006 | Liu et al. | ...................... | 717/154 |
| 2007/0186081 A1 * | 8/2007 | Chaudhry et al. | ............ | 712/214 |
| 2007/0204138 A1 * | 8/2007 | Savransky et al. | ............ | 712/217 |
| 2008/0134159 A1 * | 6/2008 | Guo et al. | ...................... | 717/154 |
| 2009/0288075 A1 * | 11/2009 | Song et al. | .................... | 717/160 |
| 2010/0274972 A1 * | 10/2010 | Babayan et al. | .............. | 711/125 |
| 2012/0198428 A1 * | 8/2012 | Schmidt | ........................ | 717/153 |
| 2012/0246448 A1 * | 9/2012 | Abdallah | ....................... | 712/214 |
| 2013/0125097 A1 * | 5/2013 | Ebcioglu et al. | ............. | 717/136 |
| 2013/0166886 A1 * | 6/2013 | Sasanka et al. | ............... | 712/216 |
| 2013/0262838 A1 * | 10/2013 | Al-Otoom et al. | ............ | 712/225 |
| 2013/0283014 A1 * | 10/2013 | Wang et al. | ................... | 712/217 |

OTHER PUBLICATIONS

Fernando Castro, et al., Title: Memory Disambiguation Hardware: a Review, JCS&T vol. 8 No. 3, Oct. 2008.*
Castro et al., Title: "Memory Disambiguation Hardware", JCS& T vol. 8 No. 3., 2008.*

* cited by examiner

*Primary Examiner* — Issac Tecklu
*Assistant Examiner* — Hossain Morshed
(74) *Attorney, Agent, or Firm* — Trop, Pruner & Hu, P.C.

(57) ABSTRACT

A method of memory disambiguation hardware to support software binary translation is provided. This method includes unrolling a set of instructions to be executed within a processor, the set of instructions having a number of memory operations. An original relative order of memory operations is determined. Then, possible reordering problems are detected and identified in software. The reordering problem being when a first memory operation has been reordered prior to and aliases to a second memory operation with respect to the original order of memory operations. The reordering problem is addressed and a relative order of memory operations to the processor is communicated.

18 Claims, 8 Drawing Sheets

```
FOR EACH MEMOP RETIRED {
    HazardDetected = FALSE
    index = Hash(memop.Address)
    if (memop.type == store)
        if ((PSN(PSNPtr) < LSSN(index) ||
            PSN(PSNPtr) < MLSN(index))
            HazardDetected = TRUE
        else
            LSSN(index) = PSN(PSNPtr)
    else if (memop.type == load)
        if (PSN(PSNPtr) < LSSN(index))
            HazardDetected = TRUE
        else if (PSN(PSNPtr) >= MLSN(index)
            MLSN(index) = PSN(PSNPtr)

if (HazardDetected) {
        ClearAH();
        DoAbortOrRecover();
    }
    else
        ++PSNPtr // next entry in PSN
}
```

FIG. 4

MEMORY DISAMBIGUATION HARDWARE TO SUPPORT SOFTWARE BINARY TRANSLATION

FIELD OF THE INVENTION

The present disclosure relates generally to microprocessors, and more particularly, a method to support software binary translation.

BACKGROUND

Multi-core processors are found in most computing segments today, including servers, desktops and System on a Chip (SoC). The move to these multi-core processor systems necessitates the development of parallel programs to take advantage of performance. Programming a multi-core processor system, however, is a complex task because of the non-deterministic nature of the software execution on these systems. This non-determinism comes from many reasons, including the multitude ways in which the different threads of execution interleave in shared memory, making the reproduction and the understanding of a program execution difficult.

Computer systems execute instructions of various code. Often, the code is not designed for a particular processor, and the codes performance on a given platform can suffer. Effective optimizations can improve performance and reduce power consumption. There has been a great deal of work to develop optimization techniques. Unfortunately, these techniques have only been applied with a limited optimization scope. Complicated memory models of modern processors hinder memory operations for multi-threaded programs.

The problem of memory disambiguation arises when one reorders memory operations with respect to each other without knowing if the memory addresses of the 2 operations alias and at least one of them is a write. This introduces hazards into the program which were originally absent. Any optimization that allows such a reordering thus has to detect such aliases at runtime and recover accordingly. Any detection mechanism thus has to have 2 pieces of information 1) whether or not a memory operation has been reordered with respect to the other memory operations in some original order and 2) whether the dynamic address of the memory operations are the same. There are various implementations and proposals depending on what kind of reordering is done (only loads, loads and stores), where the reordering occurs (in hardware or software), whether instructions in the machine are dynamically scheduled or statically scheduled etc.

Statically scheduled code (VLIW) uses checked load. This means that a load is moved above store(s), and check-load instruction is inserted in the original location of the load to check if the load has any aliases. Some binary translation techniques use instruction prefixes to specify if a certain memory instruction needs to set its address in an alias disambiguation buffer or if it needs to check its address against other addresses. One other way of doing this, is to use regular ISA instructions to perform the check, which essentially checks that the two address ranges do not overlap. This check is done for the logical address only. Some other mechanism needs to check for physical page-level aliasing. All of these schemes have different ways of communicating these 2 pieces information with varying costs, overheads and capabilities.

BRIEF DESCRIPTION OF THE DRAWINGS

FIG. 4 is an implicit alias tracking algorithm as provided by an embodiment.

DETAILED DESCRIPTION

Figure 1:
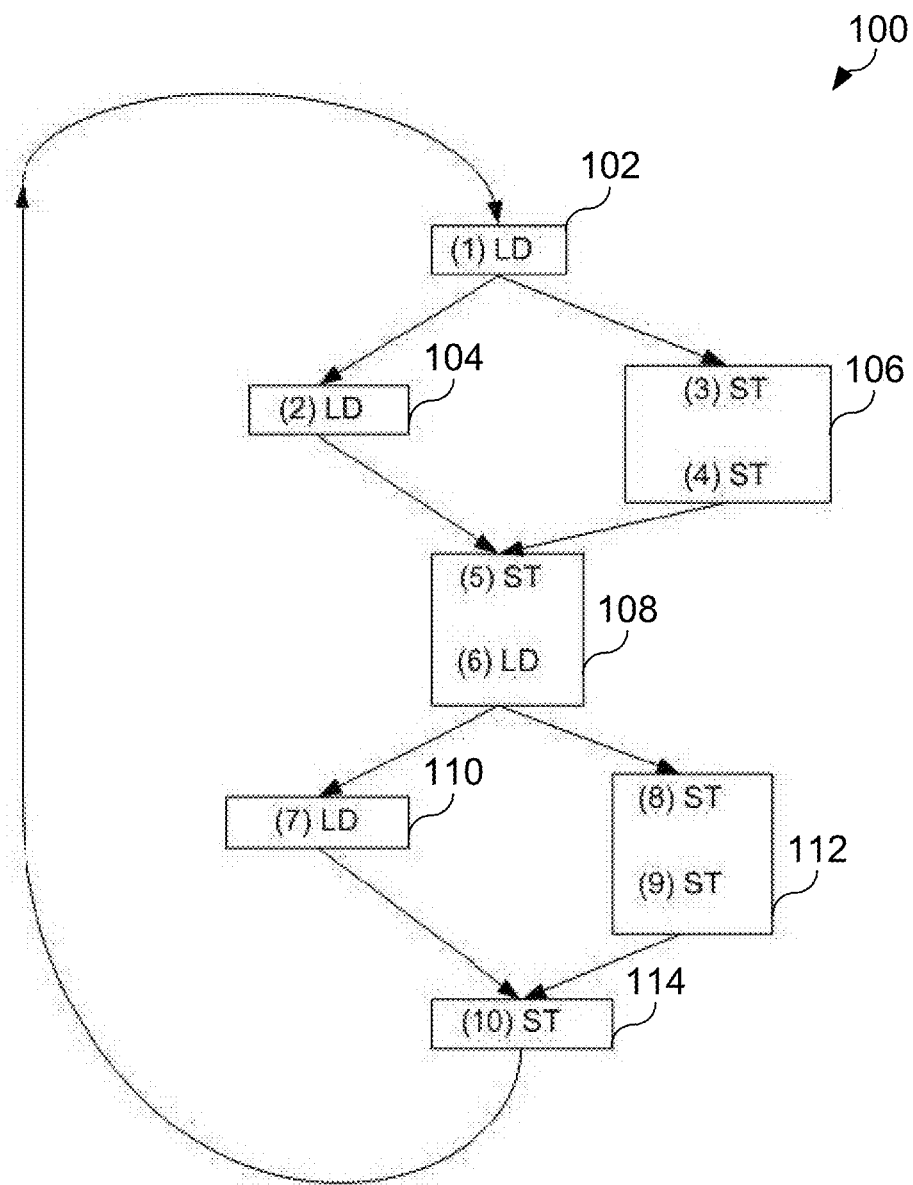
FIG. 1 is a control flow graph for a loop used to illustrate an embodiment.

Embodiments provide a method of addressing memory disambiguation in Vector Widening (VW). Disambiguation results from reordering memory operations when performing binary translation from packed Streaming SIMD Extensions (SSE) to Advanced Vector Extensions (AVX) instructions. Streaming SIMD Extensions (SSE) is a Single Instruction, Multiple Data (SIMD) instruction set extension to the x86 architecture. SSE contains a set of instructions, which predominantly work on double precision floating point data. SIMD instructions can greatly increase performance when exactly the same operations are to be performed on multiple data objects. Typical applications are digital signal processing and graphics processing. AVX provides the infrastructure to deliver the performance required by the growing needs of applications such as, but not limited to, financial analysis, media content creation, natural resource industry, and High Performance Computing (HPC). AVX provides an instruction set extension to enable flexibility in programming environment, efficient coding with vector and scalar data sets, and power-efficient performance across both wide vector data processing, and narrow vector data processing.

Memory disambiguation is one set of techniques employed by high-performance out-of-order execution microprocessors that execute memory access instructions (loads and stores) out of program order. The mechanisms for performing memory disambiguation, implemented using digital logic inside the microprocessor core, detect true dependencies between memory operations at execution time and allow the processor to recover when a dependence has been violated. They also eliminate spurious memory dependencies and allow for greater instruction-level parallelism by allowing safe out-of-order execution of loads and stores.

The widening of memory accesses can result in reordering loads and stores. Thus, the ordering of loads and stores should be verified at run time to ensure that no false dependencies have been introduced. For reasons of power and performance, the fetch/decode/execution requirements of performing these checks should be minimized.

Embodiments of the present disclosure provide a hardware/software scheme to perform alias disambiguation for VW. Embodiments allow some software instruction to explicitly manage and configure the alias detection buffer. Those software instructions reside outside the loop and need to execute only once before the loop starts executing.

At least one embodiment of the present disclosure provides a scheme where: 1) reordering occurs in software; 2) reordering of both loads and stores occurs; 3) supporting of both control and data speculative code motion within a loop; and 4) relies on RTM for speculative stores. This scheme has a low communication cost (in terms of instructions needed in software) to communicate the reordering done in software to the hardware structures. This scheme allows one to insert these instructions at arbitrary points in the loop. This scheme also enables: 1) handling of control flow within a loop naturally; and 2) processing large loops by reprogramming the alias hardware within the region if possible. The hardware structures are built such that the alias checking happens out of band (i.e. not in the critical path of execution). Moreover, each alias check is an O(1) operation which requires a constant amount of time to compute. Implicit checking allows the overhead of this mechanism to be low.

FIG. 1 is a control flow graph for a loop used to illustrate an embodiment in accordance with an embodiment. Loop 100 begins with load operation 1 in block 102. The loop diverges from block 102 in either two branches to block 104 or block 106. Operation 1 is followed by either load operation 2 in block 104, or store operation 3 and store operation 4 in block 106. The loop converges and continues with block 108 with store operation 5 and load operation 6. The loop diverges with from block 108 with block 110 and block 112 before converging again at block 114. Block 110 load operation 7 occurs while in block 112 store operation 8 and store operation 9 occur. These branches rejoin at Block 114 where store operation 10 occurs and then the process repeats by returning to block 102.

FIG. 1 shows the control flow graph for a loop in one example. This control flow graph could be a loop that has been unrolled by a factor of two (either by the compiler or the binary translator). The memory instructions within the unrolled loop have been shown and numbered. As part of an optimization (e.g. Vector Widening) the memory operations may have been reordered.

Figure 2:
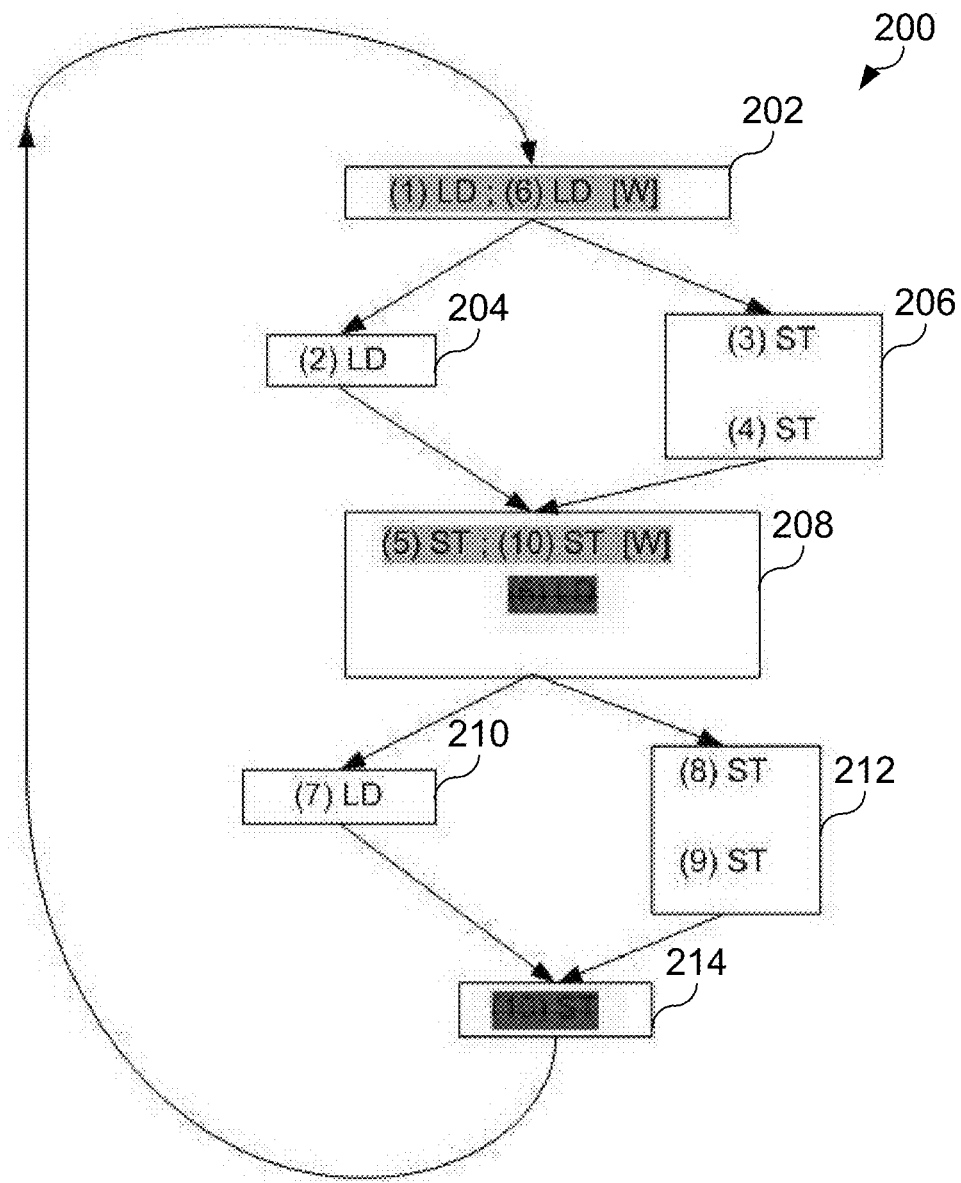
FIG. 2 provides a control flow graph for a loop illustrating the sequence of operations after the ordering/widening in accordance with an embodiment.

FIG. 2 provides a control flow graph for a loop illustrating the sequence of operations after the ordering/widening in accordance with an embodiment. After VW, loop 200 begins in block 202 with load operation 1 and load operation 6. These are followed in block 204 with load operation 2, and block 206 with store operation 3 and store operation 4. The loop converges to block 208 where following VW store operation 5 and store operation 10 occur. Paths from block 208 diverge with block 210 and block 212. In block 210, load operation 7 occurs while store operation 8 and store operation 9 occur in Block 212. The process converges on Block 214 prior to the process returning to Block 202.

Here the load operations 1 and 6 and store operations 5 and 10 have been widened as shown in FIG. 2. FIGS. 1 and 2 illustrate just one example of vector widening. Other examples may include any arbitrary code motion within the loop—one could also view this example as operation 6 being moved to the position immediately following operation 1 and operation 10 being moved to the position immediately following operation 5. One should note that in this example the control flow within the loop need not balanced (e.g. the True and False paths could be very different lengths), and that the numbers used for the memory instructions here are the sequence numbers used to program the alias structures. This has been done for simplicity—there are more optimal ways of assigning sequence numbers. Different paths through the program generate different hazard conditions as will be discussed in detail later.

The scheme provided by embodiments of the present disclosure functions by having the software communicating the original relative order of the memory operations for any given path to the hardware. The scheme uses sequence numbers and a special instruction to do this. Hardware tracks accesses to each memory address and corresponding sequence numbers. When a sequence number inversion occurs for a given address, the hardware flags a hazard at which point the process rollbacks to the previous commit point. Both the communication and the implicit checking in more detail below using our running example.

The software, which performs the reordering, assigns sequence numbers to the memory operations in the loop. These sequence numbers provide a partial ordering between memory operations in the loop with a total ordering along any one path through the loop. In the example above (FIG. 2), a total ordering across all operations has been provided. FIG. 1 thus has the original order (before reordering) and FIG. 2 has the new order (after reordering). Next the software has to communicate the ordering to the hardware. The hardware is committing instructions according to the order in FIG. 2 with knowledge of the original order. In other words, in the examples of FIGS. 1 and 2, memory instruction (operation) 2 that the hardware commits is actually memory instruction 6 in the original order. Memory operations have been treated as scalars here for simplicity. So the widened operation [1,6] can be treated as 2 scalar operations without loss of generality. In order to communicate the old order, a new instruction pushPSN (push programmable sequence numbers) is provided with 2 arguments. The first is the number of sequence numbers one are pushing with this instruction and the second is an immediate string which encodes the list of sequence numbers one are encoding. In the simple case, one would insert one such instruction for every basic block. Again more optimal placement is possible depending on the structure of the loop. In the example, one would place one in each of the 6 basic blocks. Each of these instructions pushes the sequence numbers into the PSN queue shown in the FIG. 3 (Alias Hardware).

Figure 3:
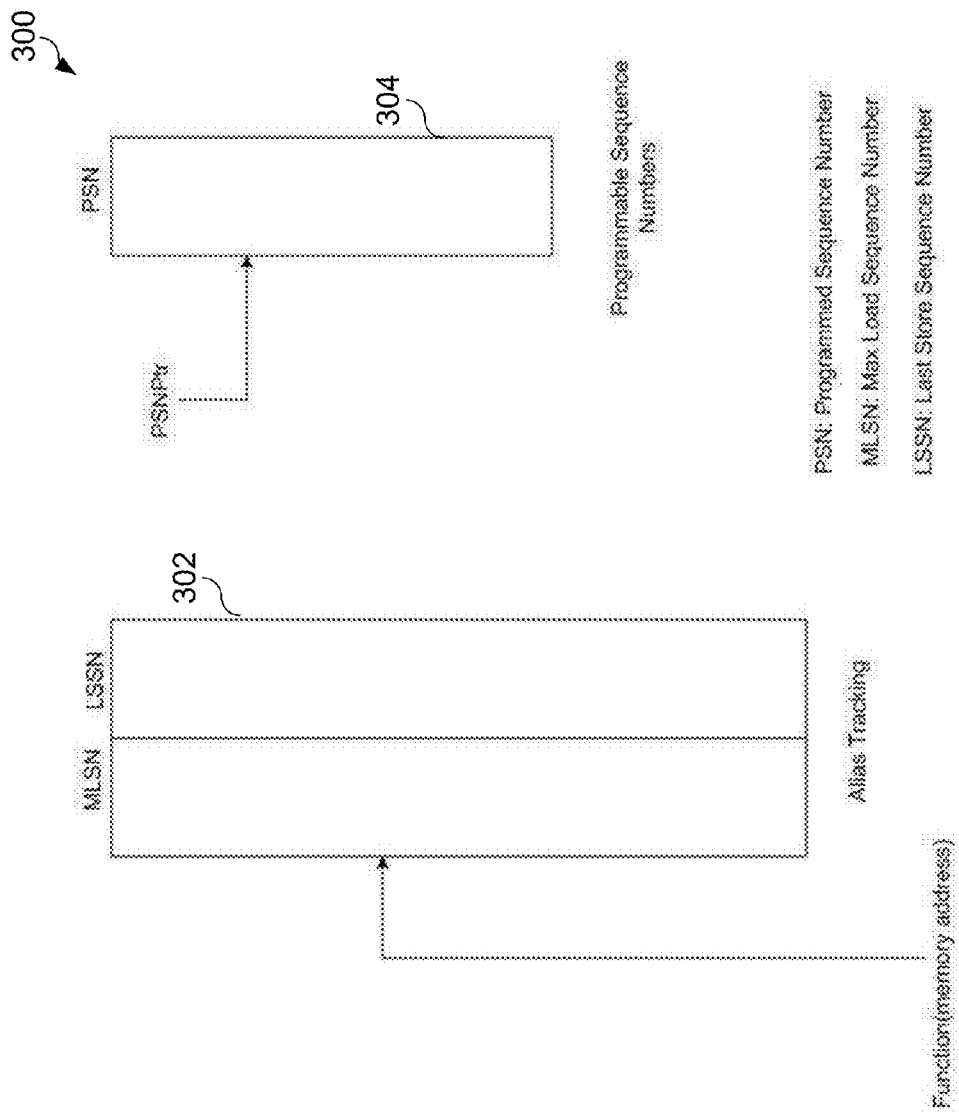
FIG. 3 is a diagram illustrating the alias hardware as provided by an embodiment.

FIG. 3 is a diagram illustrating the alias hardware as provided by an embodiment. FIG. 4 is an implicit alias tracking algorithm as provided by an embodiment. As memory instructions are retired, both structures 302 and 304 are accessed as shown in FIG. 3. The address of the retired memory instruction and a hash function are both used to index into the alias tracking table. This alias tracking table is used to identify a reordering problem based on the sequence numbers programmed. The alias tracking table 302 tracks 2 sequence numbers for each index (hash of the memory address). The MLSN (Maximum Load Sequence Number) is the largest sequence number seen thus far for a load to this address. The LSSN (Last Store Sequence Number) is the last sequence number of a store seen thus far for this address. When the entry at index into the alias tracking table is empty, the MLSN or LSSN is updated based on the PSNPtr and PSN (i.e. the current memory operation's sequence number). Two (2) fields allow the Loads and Stores to be treated separately (a LD/LD reordering to the same address is not a violation). The check is to see if the sequence number in the Alias Tracking Table corresponding to the address is higher than the sequence number in the PSN queue—this implies there was a reordering of memory operations to this address.

Adding new instructions (or instruction prefixes) to perform the set and the check operations will end up consuming machine bandwidth to fetch/decode/execute/retire those instructions, which will in turn degrade power and performance of the translated code. Since most of the code that VW handles is scientific loops, one need to perform the same exact sets and checks at every iteration of the loop. At least some embodiments of the present disclosure have some instructions outside the loop that are operable to configure the alias detection hardware that configures how to handle every memory instruction inside the loop. This way new instruction inside the loop is not added.

Figure 5:
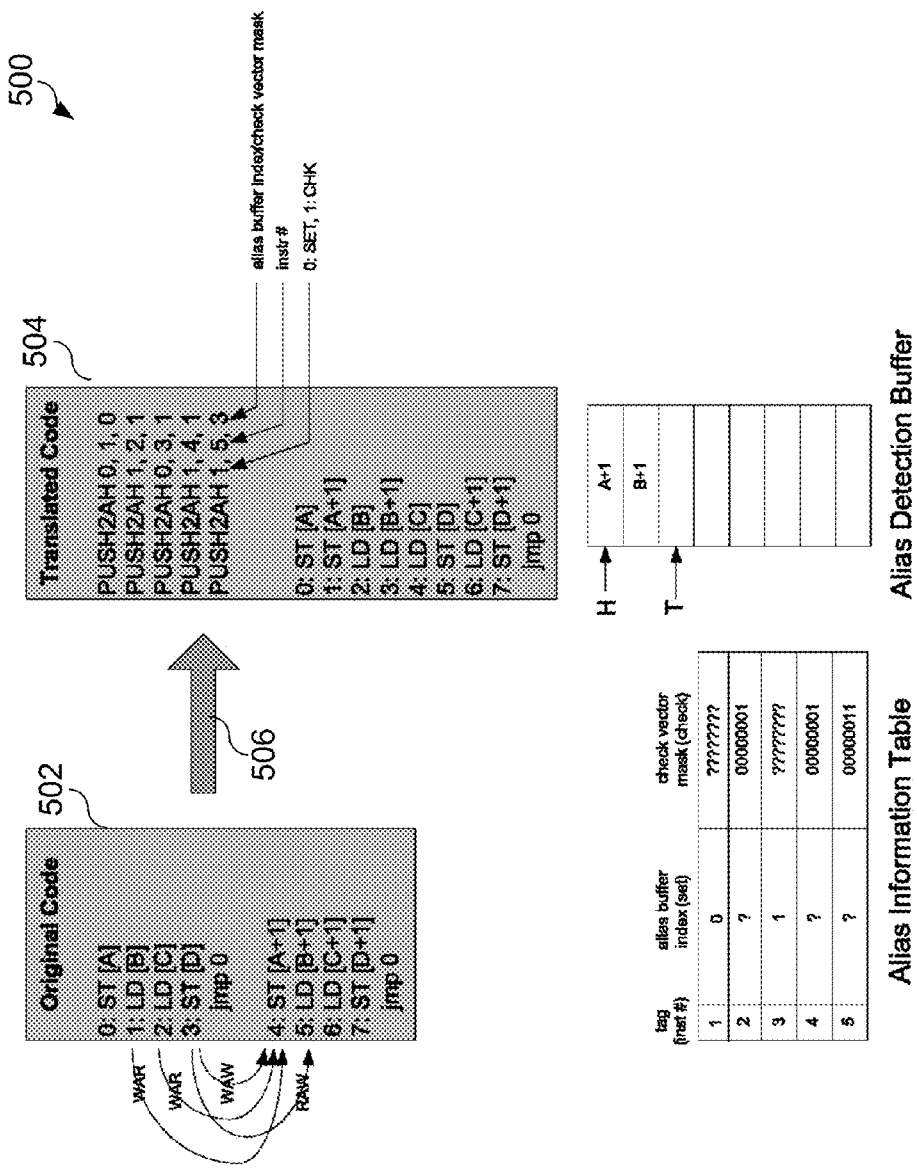
FIG. 5 is a block diagram illustrating operations associated with VW in accordance with an embodiment.

FIG. 5 is a block diagram illustrating operations associated with VW in accordance with an embodiment. To perform VW, the translator will unroll the loop once, or the loop could have been originally unrolled by the programmer. The translator will try to merge instructions, shown as the original code in block 502 from the two iterations shown into one iteration using wider vector instructions as shown in Block 504. Sometimes not all instructions in the loop can be merged, like in the example presented in the discussion of FIGS. 1 and 2. For simplicity, block 502 only shows the memory instructions within the loop, and the loop branch. Each instruction is preceded by an instruction number which numbers memory operation consecutively from the beginning of the loop. Alternatively, hardware could use the instruction IP instead of this numbering.

When the translator, shown as arrow 506, widens this loop, only instructions 0 and 1 are widened. Thus, these instructions will access a wider chunk of the memory; essentially ST A will be merged with ST A+1 and LD B will be merged with LD B+1. This means that ST A+1 is moved past instructions 1, 2, and 3, and LD B+1 is moved past 2 and 3. The code on the right side illustrates this as if it were two instructions, but in reality they are one wide instruction. These movements can create several alias hazards: 1) Read after Write (RAW); 2.) Write after Read (WAR); and 3.) Write after Write (WAW). The hardware will have to check that none of these hazards exist at run time, which means that the physical address for any two reordered instructions that might possibly have a hazard are not the same. Before starting the execution of the loop, the PUSH2AH instructions write the Alias Information Table 508 upon retirement. The PUSH2AH instruction has three fields; the first field is whether the instruction will be setting its address in the Alias Detection Buffer (ADB) or checking its address against the ADB. The second field tells which memory instruction this PUSH2AH is providing information about (the memory operation number or alternatively the IP). The third field provides the index number in the ADB where the set instruction is writing the physical address (PA) if it is a set, or the third field is the check mask if it was a check. The check mask tells against which PAs to check in the ADB.

In this example instruction 1 (ST [A+1]) will be setting its address in ADB entry 0, and instruction 3 (LD [B+1]) will be setting its address in ADB entry 1. Instruction 2 (LD [B]) and instruction 4 (LD [C]) will be checking their PA against the first entry in the ADB, and instruction 5 (ST [D]) will be checking its PA against the first and the second entries in the ADB.

By performing the above, one will not have to communicate this information on every iteration of the loop, instead they are conveyed once outside the loop, and as these memory instructions retire, the Alias Information Table will tell each instruction what checks to compute. Note that in the FIG. 5, instructions 0 and 1 will be represented as one wide vector instruction (LD [A, A+1]), thus for any set or check operation one may have to specify which half of the memory operation one will need to set or check. One could conservatively check the entire range of the memory operation rather than only checking half to avoid the need to specify.

At least some embodiments of the present disclosure solve the problem of doing hardware memory disambiguation for memory operations that have been reordered by a software binary translator or compiler. The present disclosure provides a solution that incorporates: a) a method for the software to efficiently communicate the reordering of the memory operations; and b) a method to perform the alias checking implicitly outside the critical path in the processor. The cheap communication between hardware/software allows arbitrary placement of alias instructions inside loops, without incurring a high cost, allowing one to address loops within control flow. The address indexed alias checking hardware allows a constant time check instead of a 1 to many check, making the address indexed alias checking hardware potentially faster and more scalable.

Described below are some scenarios using our running example presented in FIGS. 1-5. By varying the paths taken and showing the conditions under different aliases. The sequence numbers have assigned to indicate the path and the aliases. The path is also what is pushed into the PSN queue.

Case 1: Path: [1, 6], 3; Aliases: (6, 3). Here a load operation moves past a store operation and alias to generate a fault condition. By retiring the 2 load operations—1 and 6. Both load operations are entered in the Alias tracking table and have their corresponding MLSN set to 1 and 6 respectively. Next the store operation corresponding to store operation 3 is retired. The hardware checks the alias tracking table. Since there is an alias between operations 6 and 3, the alias tracking table is accessed to find that the MLSN there (6) is larger than the current sequence number from the PSN (3). Thus the WAR hazard is detected.

Case 2: Path: [1,6],2, [5,10],7; Aliases: (2, 6), (7, 10). Here two load operations are reordered and alias creating no fault. A store operation moves past a load operation and alias to generate a fault condition. This is an example where reordered load operation's that alias and how a fault is not generated. However, when a store operation moves above a load operation that alias, a RAW hazard is generated and detected. By retiring the 2 load operations—1 and 6. Both load operations are entered in the Alias tracking table and have their corresponding MLSN set to 1 and 6 respectively. Next, the LD corresponding to operation 2 is retired. Operation 2 aliases with 6, however since operation 2 is a load, the LSSN is checked and found to be empty. Next, the MLSN checked to determine if it is smaller, since the MLSN is not (6>2), an update to the MLSN is not required and the process continues. Next operations 5 and 10 are retired. Operations 5 and 10 also receive separate entries in the Alias tracking table. Operation 7 is retired next. Since operations 7 and 10 alias, operations 7 and 10 share an entry in the alias tracking table. In this case the PSN (PSNPtr) is less than LSSN (index) (7<10) implies a reordering and a hazard flag is generated.

Case 3: Path [1,6],2,[5,10],8,9; Aliases: (1, 2, 5) (6, 8, 10). Here there is no reordering between memory operations but there is an alias creating no fault. (ST, LD) & (LD, LD) reordering but no alias creating no fault. Store operation reordering and alias cause a fault to be generated and detected. In this case, when there is no reordering between memory operations but the memory operations are aliased, no fault is generated. Conversely, if there is reordering but no alias again, no fault is generated. Finally, when aliased store operations/instructions are reordered a fault is generated. This is flagged as a WAW hazard. By retiring the 2 load operations—1 and 6. Both load operations are entered in the Alias tracking table and have their corresponding MLSN set to 1 and 6 respectively. Then operation 2 is retired which is aliased with address for 1. A check of the MLSN is made to determine that 2>1 so no hazard exist. The MLSN is updated to operation 2 for this entry. Next operation 5 is retired. This also aliases to the same entry as 1 and 2. A check of the MLSN is performed. As the MLSN is smaller, no hazard is generated or detected. The LSSN is set to operation 5 for this entry. Next operation 10 is retired and is aliased with operation 6. A hazard does not exist as 6<10. The LSSN is updated to operation 10. Next operation 8 is retired. Operation 8 also aliases with operations 6 and 10. However, since LSSN is larger (10>8), a hazard is present.

Embodiments of the present disclosure offer many features including: 1.) Special instructions outside the loop to setup the alias detection hardware (Alias Information Table); 2.) Alias Information Table to hold specific information of what each memory instruction should do (set, check, check and set, or nothing); and 3.) Alias Detection Buffer to hold the physical addresses for memory instructions which are setting their addresses.

Creating software instructions outside the loop to setup the alias detection hardware reduces the overhead of adding additional instructions or prefixes that will execute on every iteration. There is still some overhead for those instructions outside the loop, but the number of those instructions will be much less than the dynamic instructions count in the loop. This scheme allows a binary translation system to reorder loads or stores with better performance/power characteristics.

Figure 6:
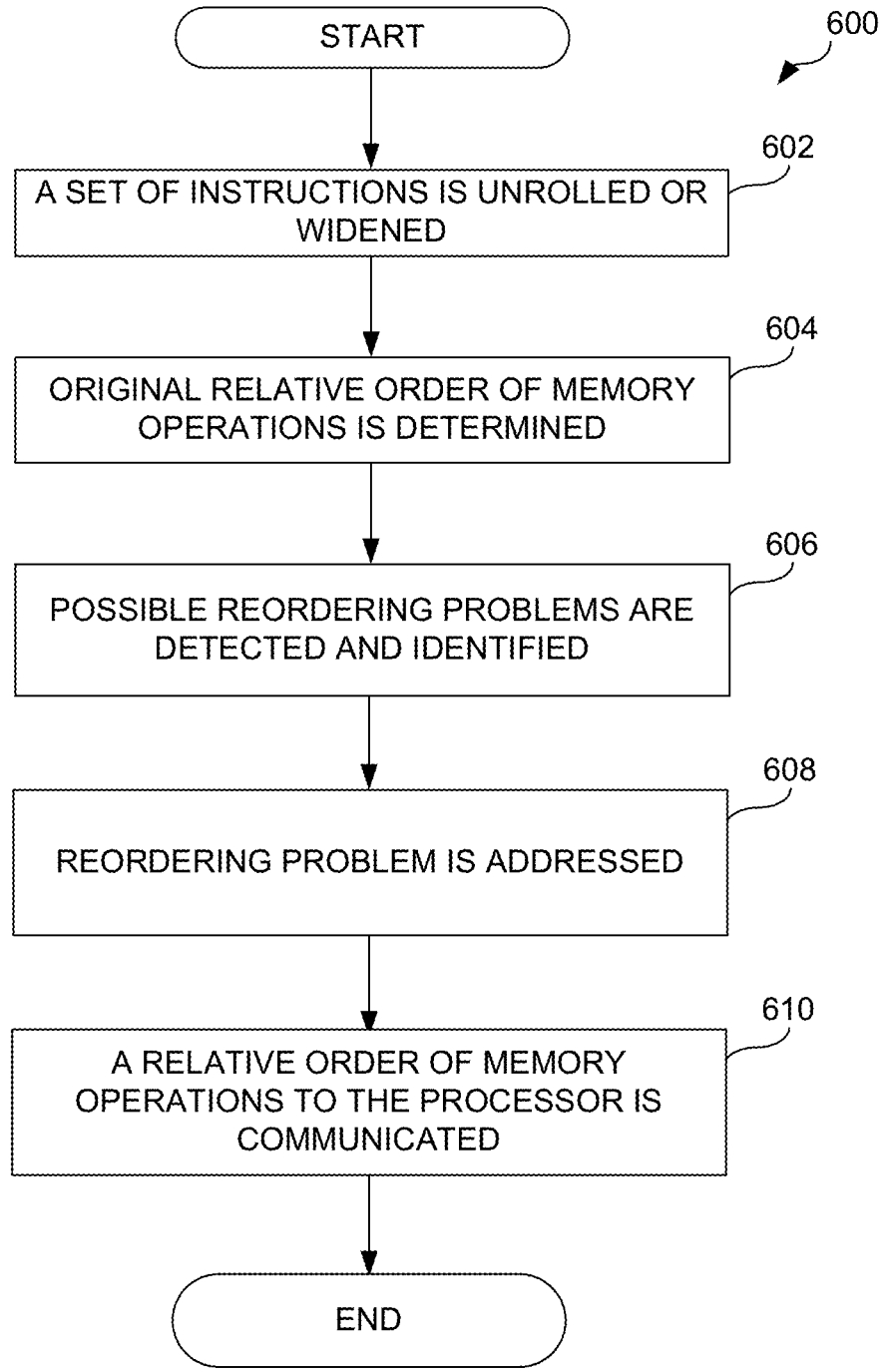
FIG. 6 is a logic flow diagram of a method of memory disambiguation in accordance with an embodiment.

FIG. 6 is a logic flow diagram of a method of memory disambiguation in accordance with an embodiment. Operations 600 begin with block 602 where a set of instructions is unrolled or widened for execution within a processor, the set of instructions having a number of memory operations. An original relative order of memory operations is determined in block 604. Then, possible reordering problems are detected and identified in software in block 606. The reordering problem being when a first memory operation has been reordered prior to and aliases to a second memory operation with respect to the original order of memory operations. The reordering problem is addressed in block 608 and a relative order of memory operations to the processor is communicated in block 610.

Figure 7:
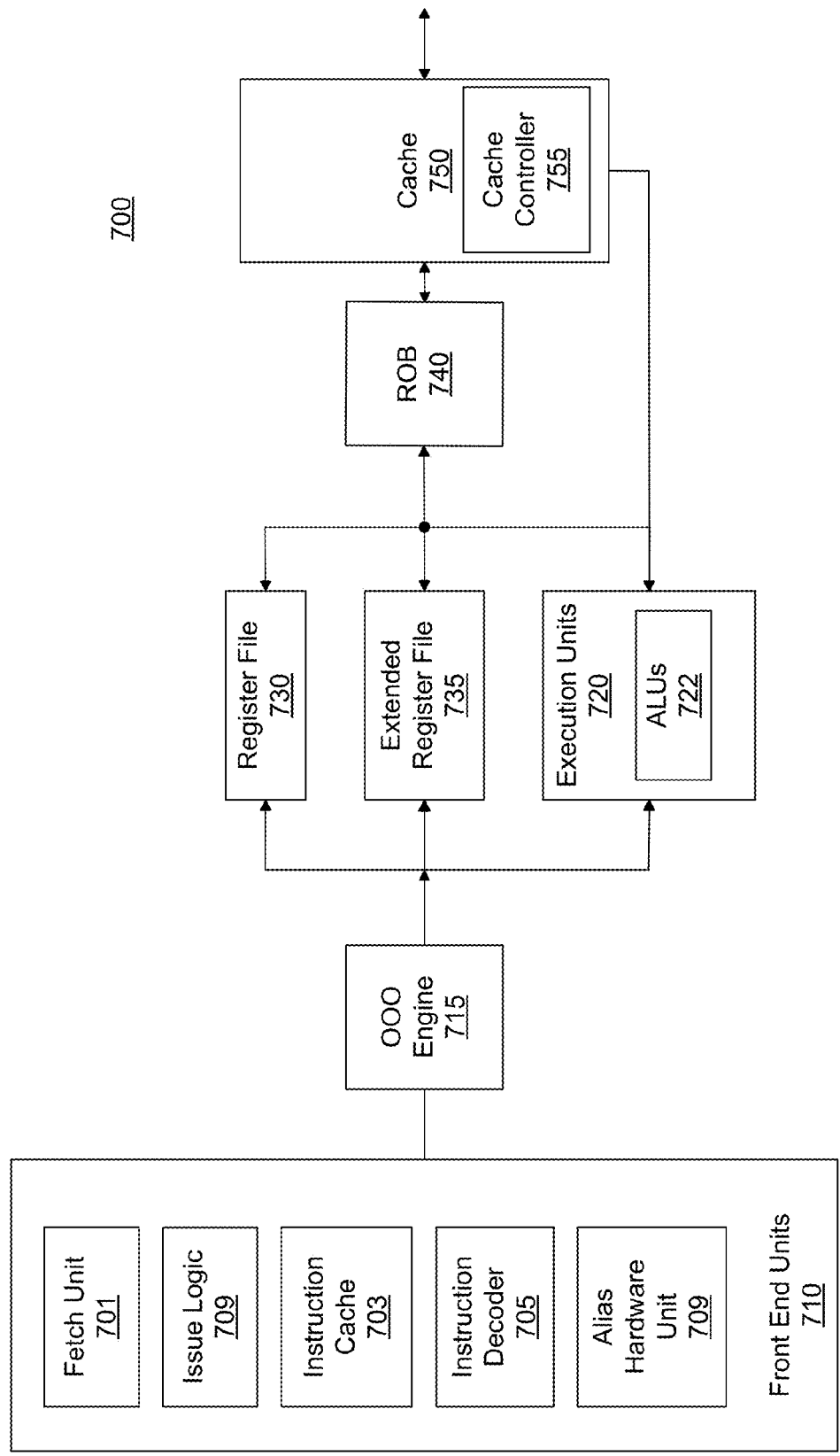
FIG. 7 is a block diagram of a processor core in accordance with one embodiment of the present invention.

Referring now to FIG. 7, shown is a block diagram of a processor core in accordance with one embodiment of the present invention. As shown in FIG. 7, processor core 700 may be a multi-stage pipelined out-of-order processor, and may operate at different voltages and frequencies (both in and out of turbo mode). As seen in FIG. 7, core 700 includes front end units 710, which may be used to fetch instructions to be executed and prepare them for use later in the processor. For example, front end units 710 may include a fetch unit 701, an instruction cache 703, an instruction decoder 705, issue logic 707 and alias hardware unit 709. In some implementations, front end units 710 may further include a trace cache, along with microcode storage as well as a micro-operation storage. Fetch unit 701 may fetch macro-instructions, e.g., from memory or instruction cache 703, and feed them to instruction decoder 705 to decode them into primitives, e.g., micro-operations for execution by the processor. In turn, issue logic 707 may schedule and issue instructions. In various embodiments, alias hardware unit 709 supports software binary translation. This method includes unrolling a set of instructions (vector widening) to be executed within a processor, the set of instructions having a number of memory operations. An original relative order of memory operations is determined. Then, possible reordering problems are detected and identified in software. The reordering problem being when a first memory operation has been reordered prior to and aliases to a second memory operation with respect to the original order of memory operations. The reordering problem is addressed and a relative order of memory operations to the processor is communicated.

Coupled between front end units 710 and execution units 720 is an out-of-order (OOO) engine 715 that may be used to receive the micro-instructions and prepare them for execution. More specifically OOO engine 715 may include various buffers to re-order micro-instruction flow and allocate various resources needed for execution, as well as to provide renaming of logical registers onto storage locations within various register files such as register file 730 and extended register file 735. Register file 730 may include separate register files for integer and floating point operations. Extended register file 735 may provide storage for vector-sized units, e.g., 256 or 512 bits per register.

Various resources may be present in execution units 720, including, for example, various integer, floating point, and single instruction multiple data (SIMD) logic units, among other specialized hardware. For example, such execution units may include one or more arithmetic logic units (ALUs) 722, among other such execution units.

Results from the execution units may be provided to retirement logic, namely a reorder buffer (ROB) 740. More specifically, ROB 740 may include various arrays and logic to receive information associated with instructions that are executed. This information is then examined by ROB 740 to determine whether the instructions can be validly retired and result data committed to the architectural state of the processor, or whether one or more exceptions occurred that prevent a proper retirement of the instructions. ROB 740 may handle other operations associated with retirement.

As shown in FIG. 7, ROB 740 is coupled to a cache 750 which, in one embodiment may be a low level cache (e.g., an L1 cache) although the scope of the present invention is not limited in this regard. Cache 750 may be a private cache that can be used as a speculative buffer as described herein. As further seen, cache 750 can include (or be associated with) a cache controller 755 which can perform conflict detection in accordance with an embodiment of the present invention. Also, execution units 720 can be directly coupled to cache 750. From cache 750, data communication may occur with higher level caches, system memory and so forth. While shown with this high level in the embodiment of FIG. 7, understand the scope of the present invention is not limited in this regard. For example, while the implementation of FIG. 7 is with regard to an out-of-order machine such as of a so-called x86 ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 8:
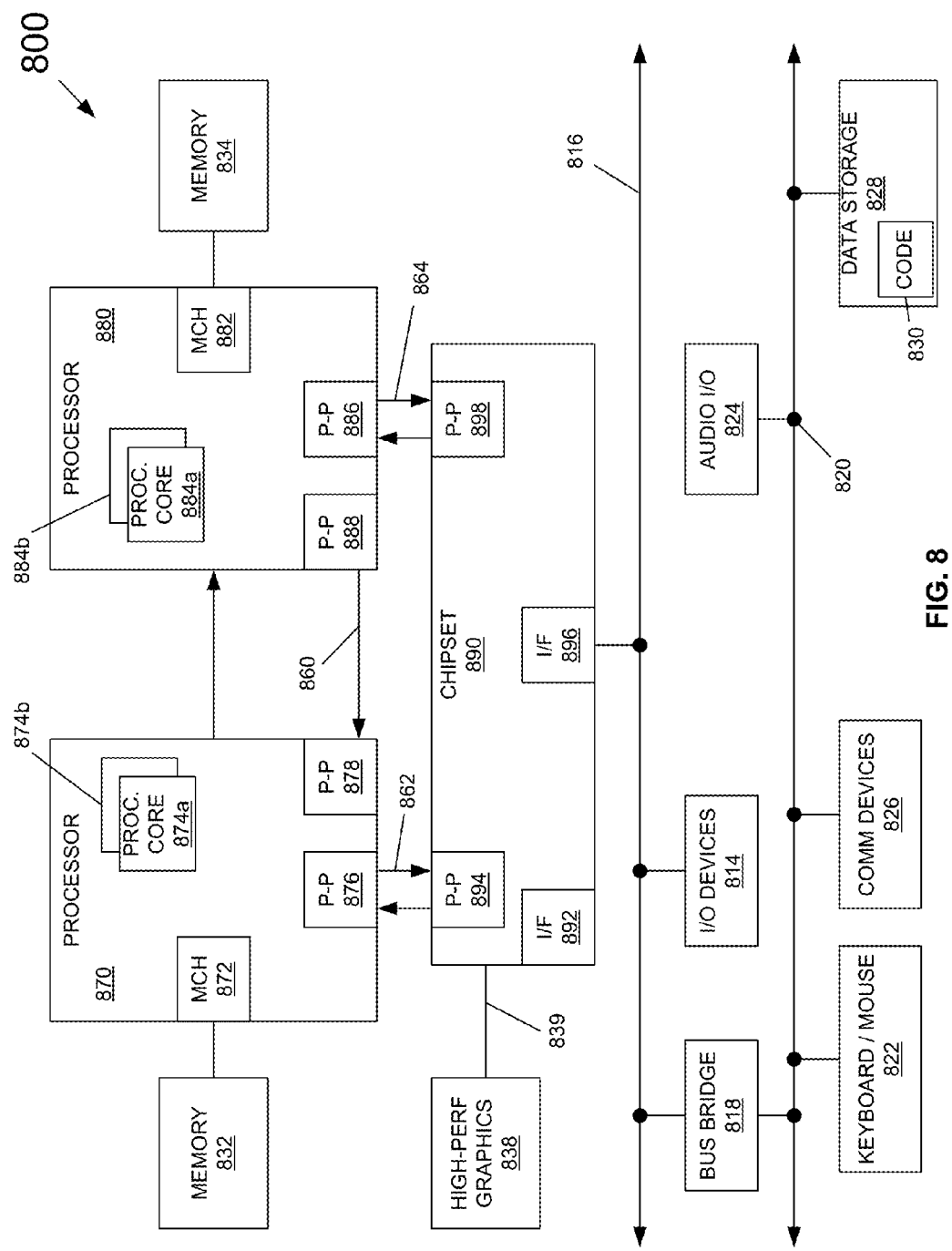
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. Each of the processors can include various hardware and/or logic to enable overlapping of atomic regions, as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, or so forth.

At least some embodiments provide a mechanism to communicate reordering by software is novel (using the proposed pushPSN instruction). The implicit checking of aliases at runtime by the hardware using the alias tracking and PSN tables is novel. The idea also piggybacks on RTM (restricted transactional memory) to support speculative stores and checkpoint/recovery.

Software such as binary translators and optimizing compilers often cannot reorder memory operations because doing scalable and precise static alias analysis is hard if not impossible in many cases. While such reordering is critical to Vector Widening it also helps vectorization in a compiler allowing the software to make more efficient use of the vector support within processor architecture. In addition it also enables optimization that need to perform reordering for scalars within loops. This enables higher performance and better energy efficiency within processors.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a core to execute instructions, the instructions comprising memory operations, the core comprising:
a register file having a plurality of registers to store data for use in execution of the instructions;
a binary translator executed within the core to:
determine a relative order of memory operations,
detect when a first memory operation has been reordered prior to a second memory operation with respect to an original order of memory operations,
identify a reordering problem of the first memory operation with respect to the second memory operation, by access to an alias tracking table that tracks at least two sequence numbers for each index, the at least two sequence numbers comprising a Maximum Load Sequence Number (MLSN) and a Last Store Sequence Number (LSSN), and
communicate the relative order of memory operations to the core; and
an alias hardware module to verify whether the memory operations are executed to distinct addresses.

2. The processor of claim 1, the instructions comprise a loop, where the loop is to be unrolled by a compiler coupled to the processor.

3. The processor of claim 1, the binary translator to assign a sequence number to each individual memory operation.

4. The processor of claim 3, the sequence number assigned to each individual memory operation comprises a push programmable sequence number (pushPSN).

5. The processor of claim 1, the alias hardware module to access:
an alias information table as each individual memory operation is retired; and
an alias detection buffer as each individual memory operation is retired.

6. The processor of claim 5, the binary translator to use a hash function to index into the alias tracking table.

7. The processor of claim 1, the alias tracking table to update the MLSN and LSSN based on a sequence number of a current memory operation when the alias tracking table index is empty.

8. The processor of claim 1, the memory operations comprise load memory operations and store memory operations.

9. The processor of claim 1, the reordering problem comprises:
at least one Read after Write (RAW) problem;
at least one Write after Read (WAR) problem; and/or
at least one Write after Write (WAW) problem.

10. A system comprising:
a multi-core processor including:
at least one core to execute instructions, the instructions comprising memory operations, the at least one core comprising:
a register file having a plurality of registers to store data for use in execution of the instructions,
a binary translator to:
determine a relative order of the memory operations,
assign a sequence number to each individual memory operation, the memory operations comprising the loop,
detect when a first memory operation has been reordered prior to a second memory operation with respect to an original order of the memory operations,
identify a reordering problem of the first memory operation with respect to the second memory operation, based on access to an alias tracking table having a plurality of indices each including at least two sequence numbers comprising a Maximum Load Sequence Number (MLSN) and a Last Store Sequence Number (LSSN), and communicate the relative order of memory operations to the at least one core; and an alias hardware module to verify whether the execution of memory operations are to distinct addresses; and a dynamic random access memory (DRAM) coupled to the multi-core processor.

11. The system of claim 10, the sequence number assigned to each individual memory operation comprises a push programmable sequence number (pushPSN).

12. The system of claim 10, the alias hardware module to access an alias information table and an alias detection buffer as an individual memory operation is retired.

13. The system of claim 12, the binary translator to index into the alias tracking table.

14. The system of claim 10, the alias tracking table to update the MLSN and LSSN based on a sequence number of a current memory operation when the index of the alias tracking table is empty.

15. The system of claim 10, the memory operations comprise load memory operations and store memory operations.

16. The system of claim 10, the reordering problem comprises:

at least one Read after Write (RAW) problem;
at least one Write after Read (WAR) problem; and/or
at least one Write after Write (WAW) problem.

17. A method comprising:

unrolling a set of instructions to be executed within a processor, the set of instructions comprising memory operations;

determining an original order of the memory operations;

detecting when a first memory operation has been reordered prior to a second memory operation with respect to the original order of the memory operations;

identifying a reordering problem of the first memory operation with respect to the second memory operation, based on access to an alias tracking table to store at least two sequence numbers comprising a Maximum Load Sequence Number (MLSN) and a Last Store Sequence Number (LSSN) per index;

addressing the reordering problem; and communicating a relative order of the memory operations to the processor.

18. The method of claim 17, communicating the relative order of the memory operations to the processor further comprising:

conveying the relative order of the memory operations to the processor when the set of instructions has been executed;

accessing an alias information table and an alias detection buffer; and computing checks on each memory operation as directed by the alias information table as an individual memory operation is retired.

* * * * *